(12) United States Patent
Golliher

(10) Patent No.: US 10,500,517 B2
(45) Date of Patent: Dec. 10, 2019

(54) SELF-RIGHTING REMOTELY CONTROLLED OBJECT

(71) Applicant: Clayton R. Golliher, Tujunga, CA (US)

(72) Inventor: Clayton R. Golliher, Tujunga, CA (US)

( * ) Notice: Subject to any disclaimer, the term of this patent is extended or adjusted under 35 U.S.C. 154(b) by 0 days.

(21) Appl. No.: 16/034,224

(22) Filed: Jul. 12, 2018

(65) Prior Publication Data

US 2019/0015756 A1 Jan. 17, 2019

Related U.S. Application Data

(60) Provisional application No. 62/531,625, filed on Jul. 12, 2017.

(51) Int. Cl.
| | | |
|---|---|---|
| *A63H 27/00* | (2006.01) | |
| *G05D 1/08* | (2006.01) | |
| *A63H 29/22* | (2006.01) | |
| *A63H 30/04* | (2006.01) | |
| *A63H 15/06* | (2006.01) | |
| *G05D 1/10* | (2006.01) | |
| *G05D 1/00* | (2006.01) | |

(52) U.S. Cl.
CPC .............. *A63H 27/12* (2013.01); *A63H 15/06* (2013.01); *A63H 29/22* (2013.01); *A63H 30/04* (2013.01); *G05D 1/0816* (2013.01); *B64C 2203/00* (2013.01); *G05D 1/0011* (2013.01); *G05D 1/101* (2013.01)

(58) Field of Classification Search
CPC ........ A63H 27/12; A63H 30/04; A63H 29/22; G05D 1/0816; G05D 1/0011; G05D 1/101; B64C 2203/00
See application file for complete search history.

(56) References Cited

U.S. PATENT DOCUMENTS

| | | |
|---|---|---|
| 7,362,234 B1 | 4/2008 | Golliher et al. |
| 7,723,195 B2 | 5/2010 | Wei et al. |
| RE42,496 E | 6/2011 | Golliher |
| 2016/0016652 A1* | 1/2016 | Barrett ............... B64C 25/06 244/15 |
| 2016/0167470 A1* | 6/2016 | Seydoux ............ B60F 3/0038 244/2 |

(Continued)

FOREIGN PATENT DOCUMENTS

| | | | | |
|---|---|---|---|---|
| WO | WO 2016003530 A2 | * | 1/2016 | ............ B64C 3/546 |
| WO | WO-2016003530 A2 | * | 1/2016 | ............ B64C 3/546 |

OTHER PUBLICATIONS https://www.nitroplanes.com/38h-miniflyer-black.html; nitroplanes.com; Jan. 8, 2012.*

(Continued)

*Primary Examiner* — Jeffrey S Vanderveen
(74) *Attorney, Agent, or Firm* — Averill & Green; Kenneth L. Green

(57) ABSTRACT

A self-righting flier includes a battery residing at a rounded bottom of a flier body, propellor blades and louvers below the propellor blades. The louvers include rounded projections extending down of bottom most corners. The bottom location of the battery and the louvers provide the self-righting of the flier. The flier further includes a top most guard preventing or reducing damage from ceiling impacts.

15 Claims, 4 Drawing Sheets

(56) References Cited

U.S. PATENT DOCUMENTS

2017/0016161 A1\* 1/2017 Tournet .................... D06F 1/10
2017/0259183 A1\* 9/2017 Matloff ................. A63H 27/12

OTHER PUBLICATIONS http://www.stormthecastle.com/model-rockets/assemble-the-crossfire.htm, www.stormthecastle.com, Mar. 14, 2008.\*
https://www.nitroplanes.com/38h-miniflyer-black.html, www.nitroplanes.com, Jan. 8, 2012.\*

\* cited by examiner

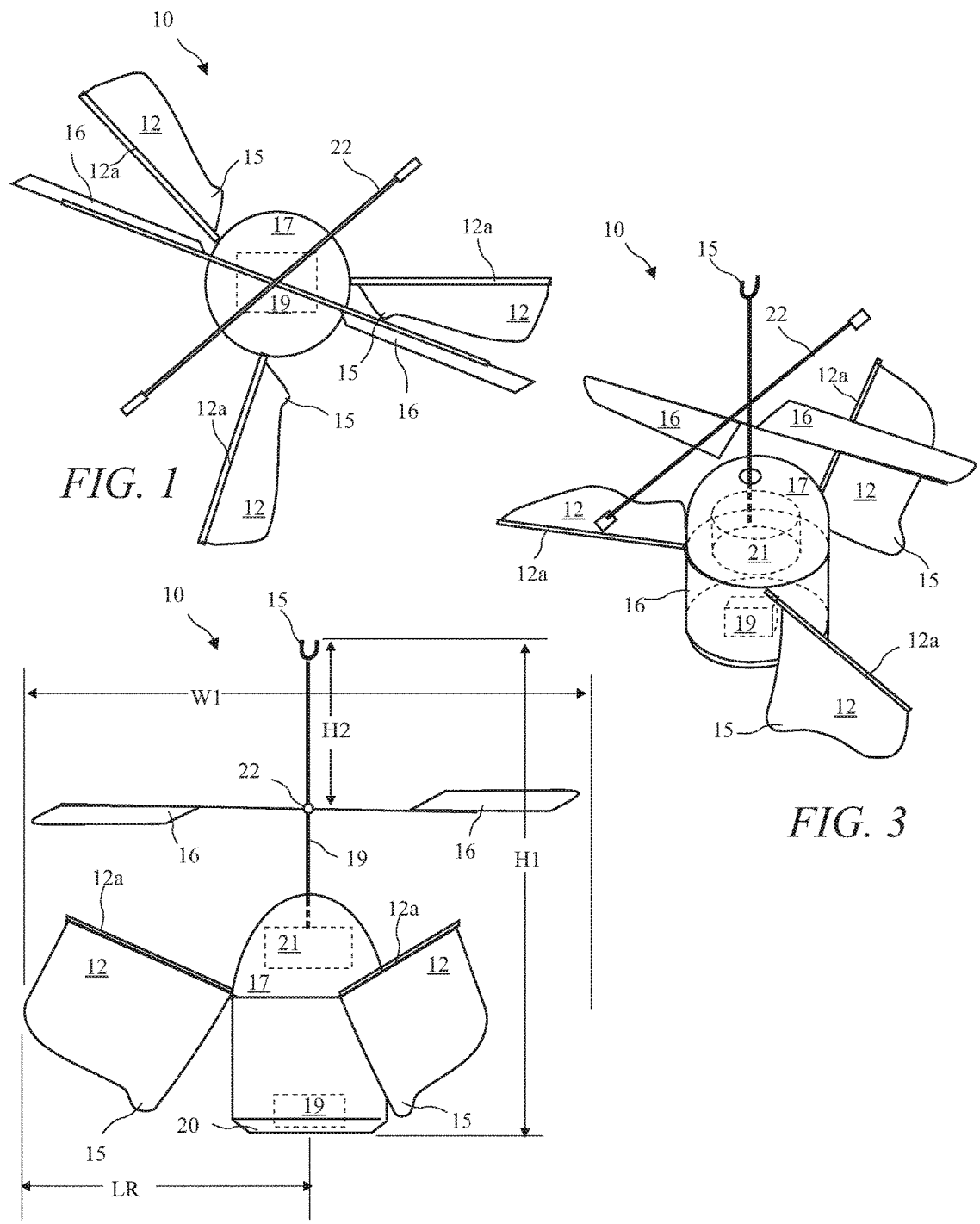

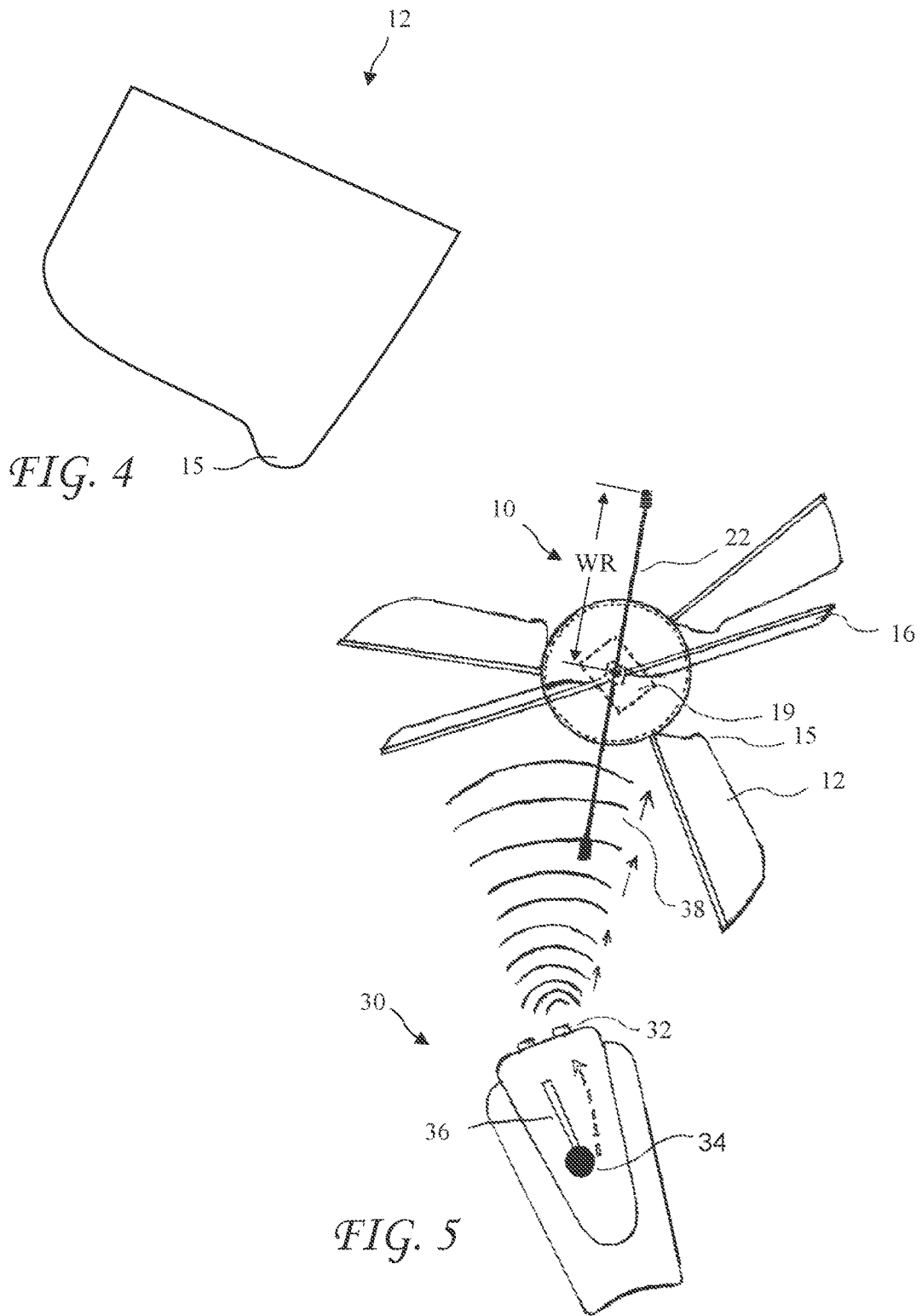

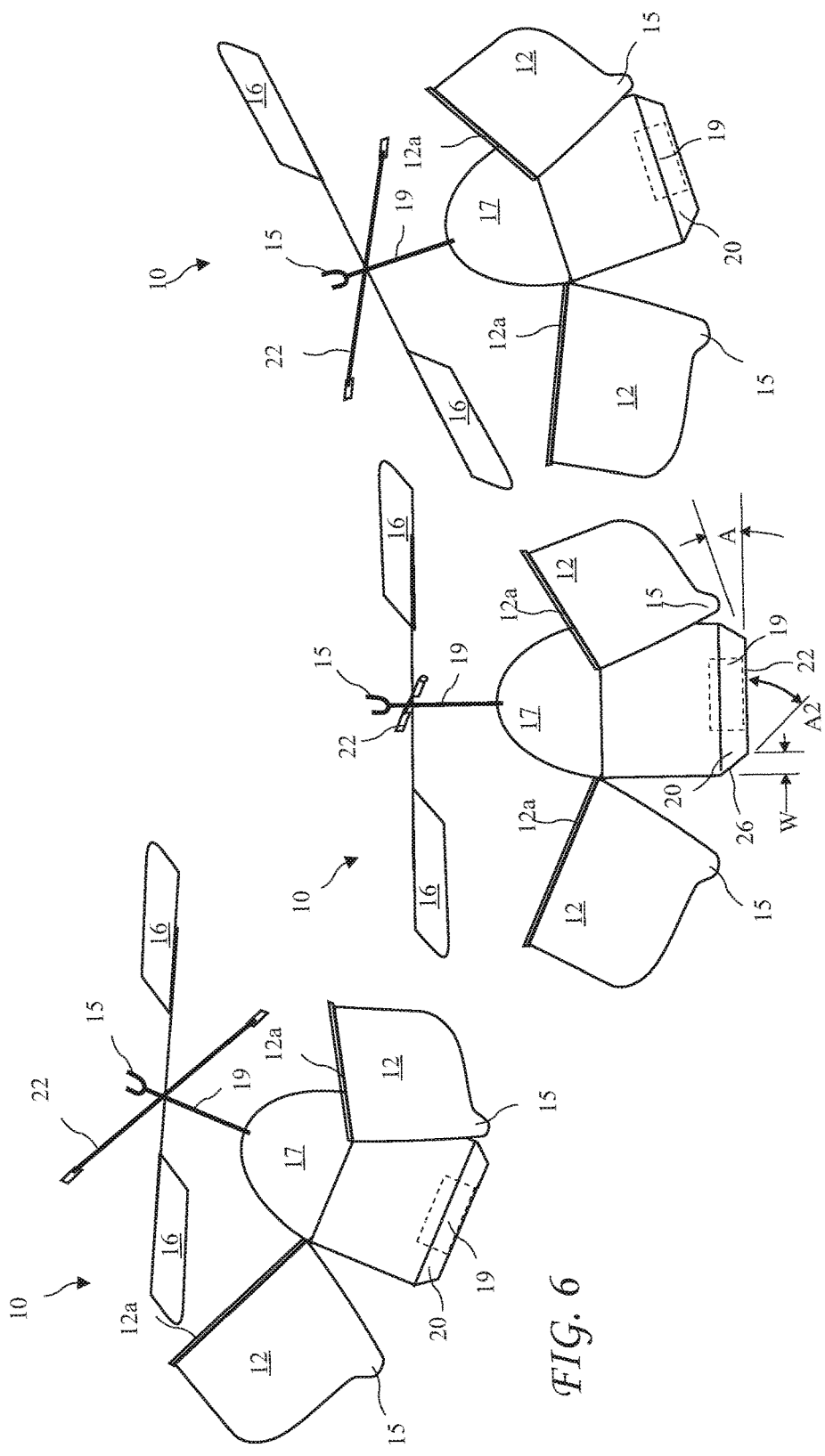

SELF-RIGHTING REMOTELY CONTROLLED OBJECT

CROSS-REFERENCE TO RELATED APPLICATIONS

The present application claims the priority of U.S. Provisional Patent Application Ser. No. 62/531,625 filed Jul. 12, 2017, which application is incorporated in its entirety herein by reference.

BACKGROUND OF THE INVENTION

The present invention relates to flying toys, and in particular to a self-righting break resistant flying toy.

Known one channel flying toys are hard to control. Known flying toys cannot right and stabilize themselves if thrown or catapulted into midair. So they cannot be used in a catapulting targeting system.

Known flying toys may fall in any position, and be damaged or have to be manually placed in an upright position before launching. Other flying toys cannot be thrown up in the air because they will not auto stabilize themselves and will crash. Other one channel fliers will stick to the ceiling and cannot be easily controlled and will tend to crash to the floor.

BRIEF SUMMARY OF THE INVENTION

The present invention addresses the above and other needs by providing a self-righting flier which includes a battery residing at a rounded bottom of a flier body, propeller blades, and louvers below the propeller blades. The louvers include rounded projections extending down the bottom most corners. The bottom location of the battery and the louvers provide the self-righting of the flier. The flier further includes a top most guard preventing or reducing damage from ceiling impacts.

In accordance with one aspect of the invention, there is provided a self-righting flier. The flier has a capability of placing itself in an upright position after falling to a surface, such as a table or ground.

In accordance with another aspect of the invention, there is provided a flier including louvers which stabilize the flier. The louvers are located below propellers and direct air downward to help keep the flier vertical, as well as stabilize its motion. The louvers include rounded bottoms which provide the self-righting feature.

In accordance with yet another aspect of the invention, there is provided a flier having batteries in the bottom of a flier body. The battery location adds stability to the flier and also helps cause it to rig ht itself.

In accordance with still another aspect of the invention, there is provided a flier having a ceiling guard above the propellers for prevent damage to the flier and ceiling and prevent vacuum created by the propeller from holding the flier against the ceiling. The ceiling guard may be "U" shaped made from rubber, foam, cloth, etc.

In accordance with another aspect of the invention, there is provided a self-righting flier in three different situations. When the flier hits the floor. From dropping out of the air and the motor is off. In midair when the motor is turned on. When the flier is laying still or stationary on its side on the floor.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a top view of a flier according to the present invention.

FIG. 2 is a side view of the flier according to the present invention.

FIG. 3 is a top and side view of the flier according to the present invention.

FIG. 4 is a louver of the flier according to the present invention.

FIG. 5 is a top view of the flier and a remote control according to the present invention.

FIG. 6 shows the flier according to the present invention tilted to the right of the vertical.

FIG. 7 shows the flier according to the present invention vertical.

FIG. 8 shows the flier according to the present invention tilted to the left of the vertical

Corresponding reference characters indicate corresponding components throughout the several views of the drawings.

DETAILED DESCRIPTION OF THE INVENTION

Figure 9:
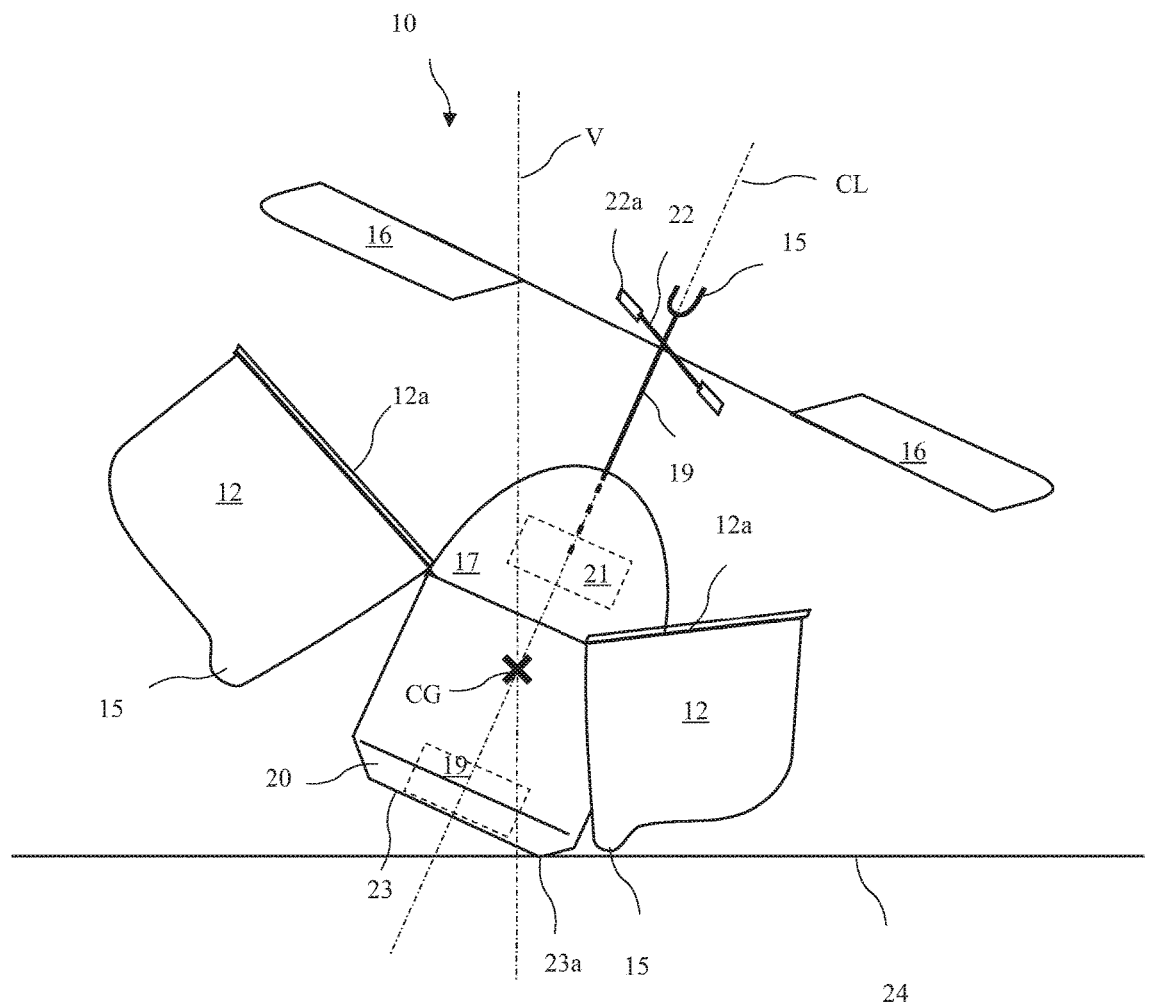
FIG. 9 shows the flier according to the present invention tilted to the right of the vertical on a horizontal surface.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, or to within 5 percent for lengths, and not a precise measurement.

A top view of a flier 10 according to the present invention is shown in FIG. 1, a side view of the flier 10 is shown in FIG. 2, and a top and side view of the flier 10 is shown in FIG. 3. The flier 10 includes a body 17 containing a battery 19 residing at the bottom 20 of the body 17 and a motor 21 residing above the battery 19. The bottom 20 assisting in self-righting the flier 10 and is preferably a resilient material to provide a bounce, or foam like material to soften landings. Propellers 16 reside above the body 16 attached to a propeller shaft 18 attached to the motor 21 and provide lift. The overall height H1 of the flier 10 is preferably between 80 and 150 mm and is more preferably about 100 mm. The overall width W1 of the flier 10 is preferably between 100 and 150 mm and is more preferably about 125 mm.

Louvers 12 below the propellers 16 are attached to louver arms 12a extending radially from the body 17 provide stability the fliers ability to right itself while in a direct a downward draft created by the propellers 16. The louvers 12 are preferably a flexible material to absorb impacts, and reach a louver radius LR out from the body 17. The radius LR is preferably between 50 and 70 mm, and more preferably about 63 mm.

A spinning gyroscopic member 22 provide further stabilization to the flier 10.

A guard 15 above the propellers 16 prevent or reduce damage to the flier 10 from ceiling impact. The guard 15 is preferably U shaped and may be made from rubber, foam, cloth, or similar material and is a height H2 above the propellers 16 (see FIG. 2). The height H2 is preferably between 30 and 50 mm and more preferably about 38 mm. The U shape causes the flier 10 to bounce when contact is made with a ceiling preventing damage. The wind from the turning propellers 16 creates a suction and may cause the flier 10 to be caught on the ceiling, and the separation of the propellers 16 from the ceiling prevents the flier 10 from becoming trapped in a vacuum caused by wind produced by the propellers 16. Further, even when decelerated gradually, the flier 10 still may be trapped by the ceiling, and then when decelerated more, significant power is lost abruptly and the flier 10 tends to drop to the floor. The bottom 20 prevents damage from impact with the floor (see FIG. 9).

A side view of the louver 12 of the flier 10 is shown in FIG. 4. The louver 12 includes a rounded projection 15 on a bottom corner. The rounded projection 15 assists in self-righting the flier 10.

A remote control (or radio transmitter) 30 and the flier 10 are shown in FIG. 5. Breakage is further prevented when the flier 10 is catapulted or thrown up in the air by turning the propellers 16 on with the remote control 30. The weight of the spinning gyroscopic member 22 acting in relationship with the weight of the battery 19 that is located at the very bottom of the flier 10 causes the flier 10 to stabilize and right itself mid-air. The combination of the gyroscopic member 22 and bottom position of the batteries makes the flier 10 easy to control and reduces breakage from falling or crashing. Breakage is also reduced by causing the flier 10 to right itself to an erect position, where it lands on the bottom 20 that absorbs energy and cause the flier 10 to bounce and not break. The bouncing effect also aids in self-righting the flier 10.

FIG. 6 shows the flier 10 landing on the rounded projection 15 of the louver 12. Louver 12 bends upon impact to absorb shock and prevent breakage. The bending of louver 12 also acts as a spring to help in the righting of flier 10. The shape of the rounded projection 15 working in a relationship with the weight of the battery 19 helps start the process of self-righting the flier 10.

FIG. 7 shows how edge 15 of louver 12 working in relationship with the battery 19 continues the process of self-righting the flier 10. Gravity continues to pull down on battery 19 which acts as a counter weight. The rounded projection 15 of louver 13 causes flier 10 to roll toward the up-right position. The rounded projection 15 is an angle A above the horizontal when the flier 10 rests upright on a horizontal surface. The angle A between the bottom of the rounded projection 15 and the flat portion 23 of the base 20 is between five and fifteen degrees and is preferably ten degrees to provide self-righting for the flier 10. When the flier 10 is falling downward and is not vertical by more than the angle A when the flier 10 impacts a horizontal surface 24 (see FIG. 9), the guard portion 15 of the louvers 12 hits the horizontal surface 24 first and urges the flier 10 towards an upright position. In other words, when the flier 10 rests a horizontal surface 24, and projections 15 and the bottom 20 of the flier 10 contact the horizontal surface 24, the center of gravity (CG) of the flier 10 is horizontally between a point of contact of a centerline (CL) of the flier 10 with the horizontal surface 24 and a point of contact of the bottom 20 of the flier 10 with the horizontal surface 24, urging the flier 10 towards an upright position.

The bottom 20 is surrounded by a bevel 26. The bevel 26 is at an angle A2 of preferably between 40 and 50 degrees, and more preferably 45 degrees, and has a width W of preferably between ¹⁄₁₆ and ³⁄₁₆ inches and more preferably ⅛ inches.

FIG. 8 shows protrusion (or projections) 15 of specific shape and size causes flier 10 to have a last nudge to final flip to flier 10 to move it to the up right position. The flat large shape of base 20 helps to cause flier 10 to stop in an upright position. This righting is also assisted by the battery 19 acting as a counter weight. The dimensions of the bottom 20, the protrusion 15, and the weight and location of the center of gravity CG (see FIG. 9) of the flier (dominantly the weight of the battery 19), cause the flier 10 to take an upright position if the flier 10 lands tilted.

FIG. 9 shows a self-righting effect of the flier 10 upon contact with the horizontal surface 24 provided by a combination of the weight of the battery 19, the resilience of the bottom 20, and the flexible protrusion 15, to cause the flier 10 to bounce or settle toward an upright position due to the center of gravity CG being on a side of a point of contact 23a of the flat bottom opposite to the contact of the flexible protrusion 15 with the horizontal surface 15. The protrusion 15 acts as a spring and urges the flier 10 to go to the upright position and the bottom 20 helps absorb shock or energy to prevent breakage to the flier 10. The bottom 20 preferably includes the flat bottom 23 to allow the flier to rest in the upright position.

The total weight of the flier 10 is preferably between 15 and 20 grams, and is more preferably 17.5 grams. The two gyroscopic arms include weights 22a each preferably weighing between 015 and 0.35 grams, and more preferably each weighing 0.25 grams. The weights 22a are preferably a weight radius WR between 40 and 46 mm from a vertical centerline CL of the flier 10, and more preferably 43 mm from a vertical centerline CL of the flier 10 (see FIG. 5).

The battery 19 preferably weighs between 2 and 3 grams, and more preferably weighs 2.5 grams and resides between 20 and 26 mm below the center of gravity of the flier 10. The weight and position of the battery 19, the propellor 16 lift, and the gyroscopic effects of the weight and locations of the gyroscopic element weights 22a, provide self-righting in mid air.

Additional self-righting of the flier 10 residing stationary on the horizontal surface 24 using the remote control 30. An operator may operate the remote control 30 to send a signal to the flier 10 to activate the motor 21 to cause the propellor 16 to provide an air flow against the horizontal surface 24 to right the flier 10 from laying stationary on the flier's side, aided by the battery 24 weight and location.

Further, the resilience bottom 20 provides a "bounce" when the flier 10 contacts that horizontal surface 24. The bounce helps right the flier 10 if the flier 10 does not land vertically.

While the invention herein disclosed has been described by means of specific embodiments and applications thereof, numerous modifications and variations could be made thereto by those skilled in the art without departing from the scope of the invention set forth in the claims.

I claim:
1. A self-righting flier, comprising:
a body having a centerline (CL), a top and a bottom, the bottom having a flat center portion perpendicular to the centerline (CL);
a battery residing in the bottom of the body;
a motor residing in the body;
louvers attached to louver arms extending radially from the body, the louvers spaced vertically apart from a horizontal surface when the flat center portion of the bottom rests in the horizontal surface and the centerline (CL) of the body is vertical; and a propeller attached to the body above the body and above the louvers and rotated by the motor, wherein the louvers include projections extending down from bottom most corners of the louvers, the projections contacting a horizontal surface when the flier is tilted more than an angle (A), the angle (A) between five and fifteen degrees, and not contacting the horizontal surface when the flier is tilted less than the angle (A).

2. The self-righting flier of claim 1, wherein the bottom of the body includes a bevel around the flat surface.

3. The self-righting flier of claim 2, wherein the bevel is between 40 and 50 degrees.

4. The self-righting flier of claim 3, wherein the bevel is 45 degrees.

5. The self-righting flier of claim 3, wherein the bevel is about 1/8 inch wide.

6. The self-righting flier of claim 1, wherein the bottom of the body is made of a resilient material.

7. The self-righting flier of claim 1, wherein the louvers include rounded projections extending down of bottom most corners.

8. The self-righting flier of claim 1, wherein the louvers include projections extending down from bottom most corners of the louvers, the projections contacting a horizontal surface when the flier is tilted more than an angle (A) of ten degrees.

9. The self-righting flier of claim 1, further including a top most guard preventing or reducing damage from ceiling impacts.

10. The self-righting flier of claim 9, wherein the guard is made from rubber, foam, or cloth.

11. The self-righting flier of claim 9, wherein the guard reaches to a height (H2) of between 30 and 40 mm above the propellers.

12. The self-righting flier of claim 9, wherein the guard reaches to a height (H2) of about 38 mm above the propellers.

13. The self-righting flier of claim 9, wherein the guard separates the propellers from a ceiling by a distance sufficient to prevent the flier from being trapped against the ceiling by a vacuum created by the propellers.

14. The self-righting flier of claim 1, wherein the motor resides above the battery.

15. The self-righting flier of claim 1, wherein:
the louvers including projections extending down from bottom most corners of the louvers; and
a vertical line through the center of gravity (CG) of the flier is on an opposite side of a point of contact of the edge of the flat bottom of the flier with the horizontal surface from the point of contact of the at least one of the projections with the horizontal surface, urging the flier towards an upright position resting only on the flat bottom.

* * * * *